(12) United States Patent
Edwards (10) Patent No.: US 7,340,773 B2
(45) Date of Patent: Mar. 4, 2008

(54) MULTI-STAGE AUTHORISATION SYSTEM

(76) Inventor: Christopher Paul Edwards, 16 Kingsdown Mount, Nottingham (GB) NG8 2RQ ( * ) Notice: Subject to any disclaimer, the term of this patent is extended or adjusted under 35 U.S.C. 154(b) by 750 days.

(21) Appl. No.: 10/474,875

(22) PCT Filed: Apr. 11, 2002

(86) PCT No.: PCT/GB02/01684

§ 371 (c)(1),
(2), (4) Date: Nov. 28, 2003

(87) PCT Pub. No.: WO02/084611

PCT Pub. Date: Oct. 24, 2002

(65) Prior Publication Data

US 2004/0143741 A1    Jul. 22, 2004

(30) Foreign Application Priority Data

Apr. 12, 2001 (GB) ................................ 0109292.3

(51) Int. Cl.
*H04L 9/32* (2006.01)
(52) U.S. Cl. .................... 726/20; 713/172; 705/65; 705/75; 705/76
(58) Field of Classification Search ............... 713/172; 726/20; 705/65, 75, 76
See application file for complete search history.

(56) References Cited

U.S. PATENT DOCUMENTS

| | | | |
|---|---|---|---|
| 5,343,529 A | 8/1994 | Goldfine et al. | |
| 5,347,580 A * | 9/1994 | Molva et al. ............... | 713/159 |
| 5,491,752 A | 2/1996 | Kaufman et al. | |
| 5,671,279 A * | 9/1997 | Elgamal ...................... | 705/79 |
| 6,075,860 A * | 6/2000 | Ketcham ..................... | 713/159 |
| 6,173,400 B1 | 1/2001 | Perlman et al. | |
| 6,212,634 B1 * | 4/2001 | Geer et al. ................... | 713/156 |
| 6,460,138 B1 * | 10/2002 | Morris ........................ | 713/184 |
| 6,654,886 B1 * | 11/2003 | Challener et al. ........... | 713/172 |
| 2002/0128977 A1 * | 9/2002 | Nambiar et al. .............. | 705/64 |

FOREIGN PATENT DOCUMENTS

| | | |
|---|---|---|
| EP | 0566811 | 4/1992 |
| EP | 0829991 | 3/1998 |
| EP | 0856820 | 8/1998 |
| EP | 0998073 | 5/2000 |
| WO | WO0042492 | 7/2000 |

* cited by examiner

*Primary Examiner*—Nasser Moazzami
*Assistant Examiner*—Daniel L Hoang
(74) *Attorney, Agent, or Firm*—Lowenstein Sandler PC (57) ABSTRACT

A system for authorizing smart cards via the Internet is provided, comprising a plurality of user stations (1-1-1-*n*) connected to a server (3) via the Internet (5). Each of the user stations (1-1; 1-*n*) is attached to a card reader (7-1;7-*n*) suitable for reading data and accessing processing modules on smart cards (8-1-8-*m*). When a new card is to be issued, initially the server (3) generates and stores a task identifier as a task record (15) on a database (10) connected to the server (3). The task identifier is also dispatched to a user station (1-1; 1-*n*). A subsequent data submission by the user station (1-1; 1-*n*) is then required to include signed data incorporating authorization data and the received task identifier. When all the data required for authorization of a smart card (8-1; 8-*m*) has been received, the server (3) checks the signed data to confirm each data submission comprises data incorporating a correct task identifier utilised for the current authorization procedure.

10 Claims, 10 Drawing Sheets

MULTI-STAGE AUTHORISATION SYSTEM

The present invention concerns secure multi-stage authorisation systems. In particular, the present invention concerns a secure multi-stage authorisation system in which data is transmitted over a public network such as the Internet.

The Internet provides a convenient means by which data stored on remote computers may be accessed. However, the public nature of the Internet means that websites accessible by the Internet are exposed and difficult to secure. Where a website contains sensitive data it is therefore essential to provide additional security to prevent unauthorised access.

One means by which access to a website may be made secure is by use of cryptographically enabled smart cards. Specifically, private/public key encryption modules may be provided by a smart card or other portable data processing device. The public/private key encryption modules can then be used to 'sign 'and encrypt data which is transmitted over the potentially insecure connection.

In order for smart cards to prevent unauthorised access to websites, it is necessary to ensure that smart cards for accessing a remote computer are only issued to authorised individuals. For this purpose, smart card issuance and authorisation systems generally require a number of multiple operations (e.g. collect data, authorise, witness, request certificate etc) to ensure that cards are not erroneously or fraudulently issued.

Although a multiple stage authorisation process can ensure a card is not inappropriately issued, where multi-stage operations are themselves effected across a public network such as the Internet it is possible that the authorisation operations themselves may be intercepted and later duplicated to obtain fraudulent authorisation.

There is therefore a need for a multistage authorisation system in which data may be transferred via a public network but which prevents fraudulent authorisation from being obtained.

In accordance with one aspect of the present invention there is provided a data validation process comprising the steps of:

storing a task identifier on a server and dispatching a copy of said task identifier to a remote station;

at said remote station, for a plurality of items of transaction data, combining said task identifier with a said item of transaction data and signing said combined data utilising an encryption method;

dispatching said signed data to said server together with identification data; and verifying the validity of the received signed data at said server, utilizing an encryption method selected on the basis of said identification data received with signed data to determine if said signed data was generated from combined data incorporating said task identifier.

Further aspects and embodiments of the present invention will become apparent with reference to the following description and accompanying drawings in which.

FIRST EMBODIMENT

Figure 1:
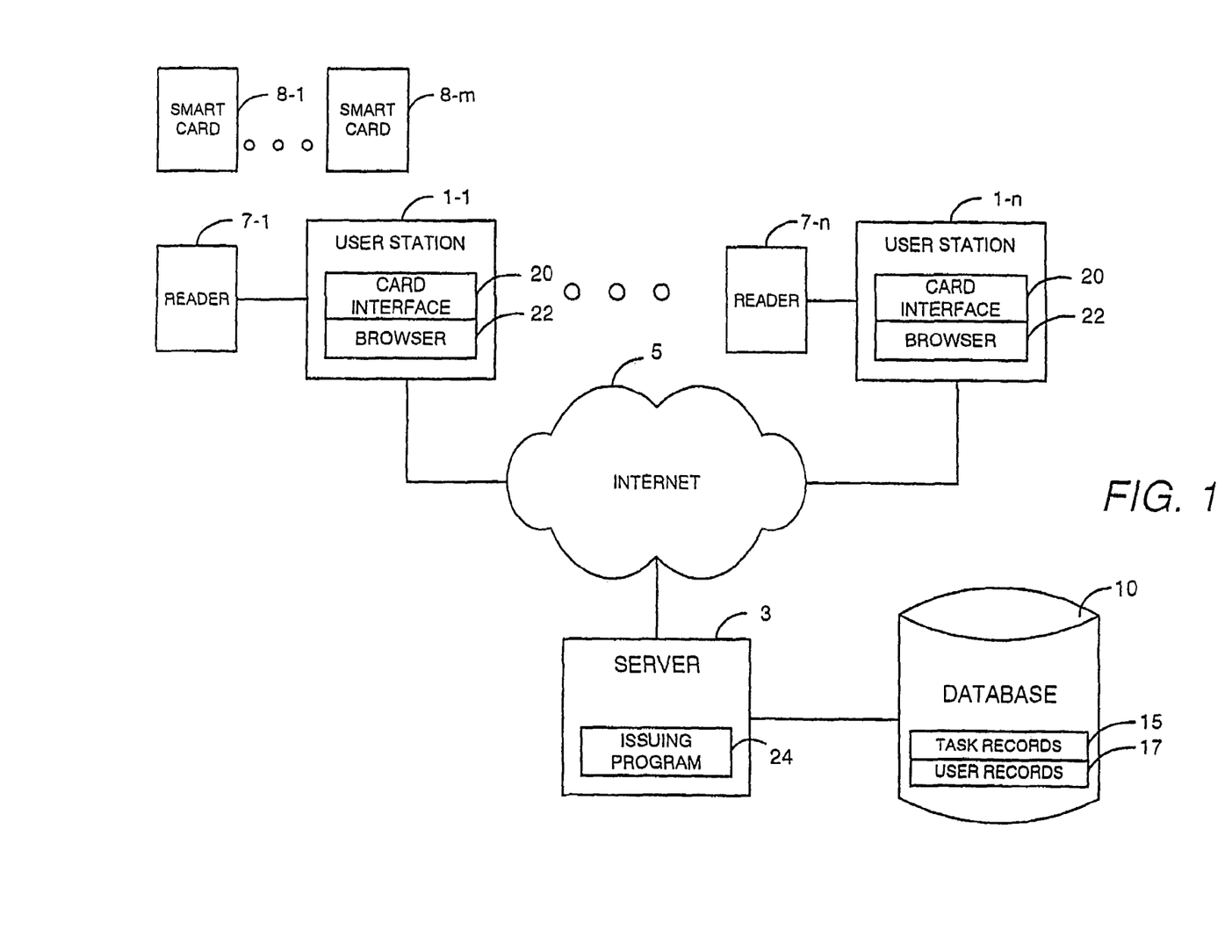
FIG. 1 is a schematic block diagram of a computer network in accordance with a first embodiment of the present invention.

FIG. 1 is a schematic block diagram of a computer network in accordance with a first embodiment of the present invention. The computer network comprises a plurality of user stations 1-1-1-$n$ that are all connected to a server 3 via the Internet 5. Individual smart card readers 7-1-7-$n$ connected to each of the user stations 1-1-1-$n$ are provided enabling communication between a number of smart cards 8-1-8-$m$ and the respective user stations 1-1-1-$n$. In this embodiment the smart cards 8-1-8-$m$ each comprise cryptographically enabled smart cards for encrypting data utilizing conventional public/private key encryption technology.

The server 3, in addition to being connected to the Internet 5 is also connected to a database 10 which is arranged to store task records 15 and user records 17. In the memories of each of the user stations 1-1-1-$n$ is stored a card interface module 20 and a browser program 22. Stored within the memory of the server 3 is an issuing program 24.

In accordance with this embodiment of the present invention, the card interface module 20, browser program 22 and issuing program 24 interact together with encryption modules provided on the smart cards 8-1-8-$m$ to enable data for effecting an update of user records 17 to be transmitted via the Internet 5 in a number of stages whilst preventing updates from occurring if data transmitted via the Internet 5 is intercepted and modified or reused.

Specifically, the present embodiment will be described with reference to the process of updating user records 17 to effect issuing and authorising of new smart cards 8 for later access to the server 3 and database 10. It will be appreciated that as issuance and authorisation of a smart card normally enables the holder of the smart card to access data, it is imperative that such a process is conducted in a secure manner. Although the present embodiment will be described in terms of the issuance and authorisation of a smart card 8, it will be appreciated that the present invention is applicable to any process requiring the secure transmission of multiple sets of data via a public and therefore potentially insecure network.

In use, in this embodiment, the integrity of authorisation data is ensured in a number of ways. Initially, when a connection is first made between a user station 1-1; 1-$n$ and the server 3 a session identifier is generated and stored within the database 10. A copy of the session identifier is then dispatched and stored in the memory of the user station 1-1; 1-$n$ making the connection. All subsequent transmissions between the user station 1-1; 1-$n$ and the server 3 in the case of a session are then made to include this session identifier. Thus only a user station 1-1; 1-n having a stored session identifier can submit data and any data resubmitted from another session can be detected.

Additionally, whenever a new task is initiated by a user station 1-1; 1-n, for example the processing required to authorise a new smart card 8, a unique task identifier is transmitted by the server 3 for inclusion in the next submission to be made in the session. These unique task identifiers are stored together with session identifiers as task records 15 within the database 10. By requiring the inclusion of the appropriate task identifier in each data submission effecting a stage in a task, attempted resubmissions of data from other tasks within a session can be detected.

Finally, whenever data is submitted, the data including both the session identifier and task identifier is required to be "signed" by the user submitting the data by generating message hash data from the complete data submission including both the session identifier and task identifier. This message hash data is then encrypted, utilising an encryption module provided on the user's smart card 8. Thus in this way the format and content of each data submission and the identity of the smart card 8 utilised to submit the data can be confirmed.

When the issuing program 24 of the server 3 determines that data for all stages of a task, for example a multiple stage authorisation process, have been received from a user station 1-1; 1-n the received data is checked to ensure that the session identifiers and task identifiers included within the received data correspond to a set of session identifiers and task identifiers stored as task records 15. The issuing program 24 then confirms that decoding the message hash data confirms that the submission has not been altered and confirms the identity of the smart card 8 utilised to submit the data. If the data is determined to be unaltered, the issuing program 24 then determines whether the user as represented by data on the previously issued smart card 8-1, 8-n, utilised to generate the message hash has authority to authorise the issuance of a card. If this is the case, the received data is then processed to generate a new user record 17 thereby activating a new smart card 8 for access to the server 3.

By providing a system in which all data submissions made by a user station 1-1 to the server 3 are made to incorporate a session identifier and task identifier, a means is provided to detect the re-submission of any data involved from an earlier authorisation procedure. Thus in this way, every data submission made by a user station 1-1; 1-n to the server 3 is uniquely identified and locked into the task and the session from which it originated. If for any reason a data submission is intercepted as it is transmitted via the Internet 5, the re-use of such data can be detected and unauthorised issuance prevented. The complete authorisation process can therefore be effected in a secure manner even if individual data submissions happen to be intercepted.

Prior to describing in detail the processing of the browser program 22 and the issuing program 24, data structures for the task records 15 and user records 17 and the programs and data stored on a smart card 8 will first be described in detail with reference to FIG. 2.

Figure 2:
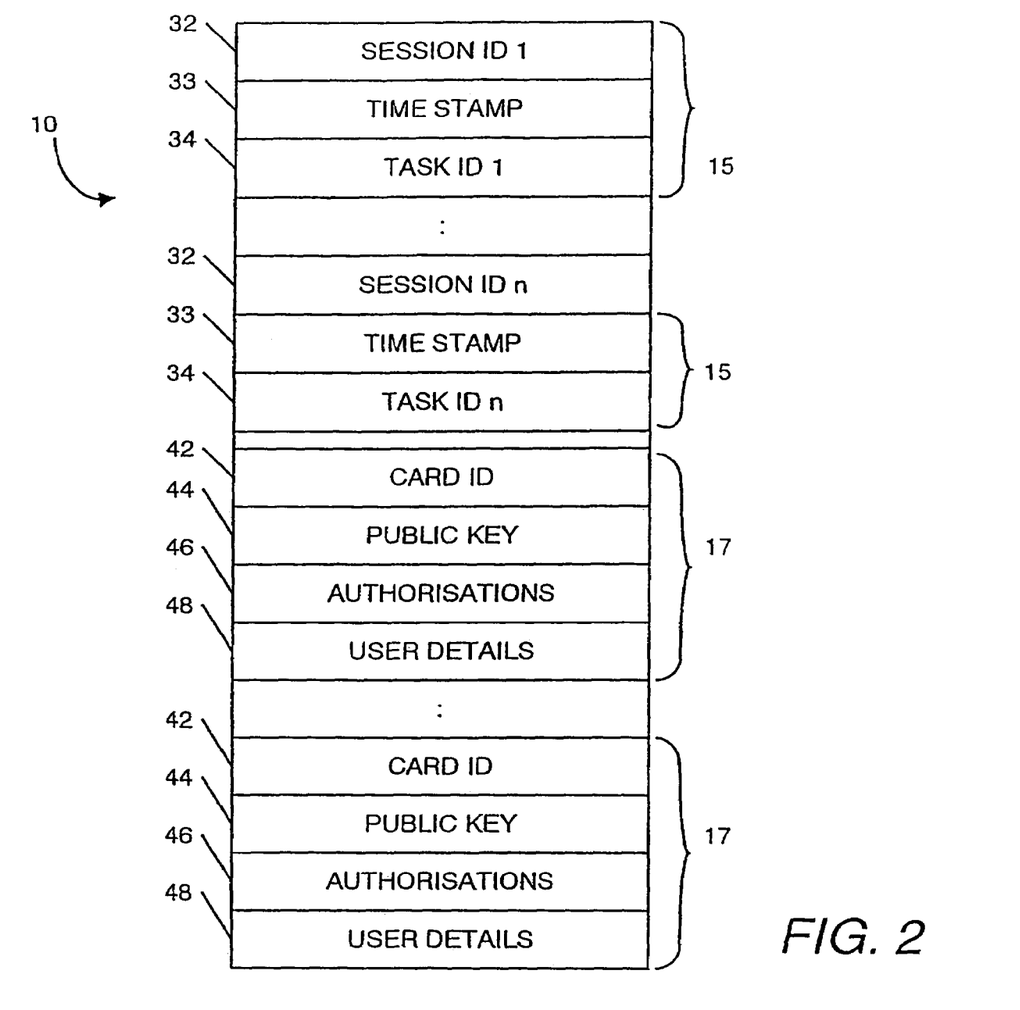
FIG. 2 is a schematic block diagram of task records and user records stored within a database of the computer network of FIG. 1.

FIG. 2 is a schematic block diagram of the content of database 10 containing task record 15 and user records 17.

In this embodiment, each task record 15 comprises a session identifier 32, a time stamp 33 and a task identifier 34. Whenever a user station 1-1; 1-n first accesses the server 3 via the Internet 5, a new task record 15 comprising a newly generated session identifier 32, a time stamp 33 being the current time and a task identifier 34 is created and stored in the database 10. Subsequently, whenever further a new task is initiated by a user station 1-1; 1-n in the course of that session, additional task records 15 are generated and stored comprising the same session identifier 32, a new time stamp 33 and a task identifier 34 for the new task. As will be described in detail later when an authorisation procedure has been completed, the task records 15 are then utilised to confirm that data has in fact been received from an authorised individual.

In addition to the task records 15, in this embodiment a set of user records 17 are also stored within the database 10. In this embodiment, the individual user records 17 each comprise card identification data 42 for identifying a smart card 8, public key data 44 for encrypting data and being part of a public/private key pair in which the private key data is stored on the smart card 8 identified by the card identification data 42; authorisation data 46 being data identifying the processes the user represented by the user record 17 is authorised to perform; and user details data 48 being data such as the name and address identifying individual to whom a smart card 8 identified by the card identification data 42 has been issued.

As will be described in detail later in this embodiment the user records 17 are utilized to establish whether requests for issuing further smart cards 8 are valid. It will be appreciated that once a user record 17 linking a smart card 8 with authorisation data 46 has been generated and stored within the database 10, this database of authorised and issued smart cards could be utilized to restrict access to data stored elsewhere on the database 10, the server 3 or any other system.

Figure 3:
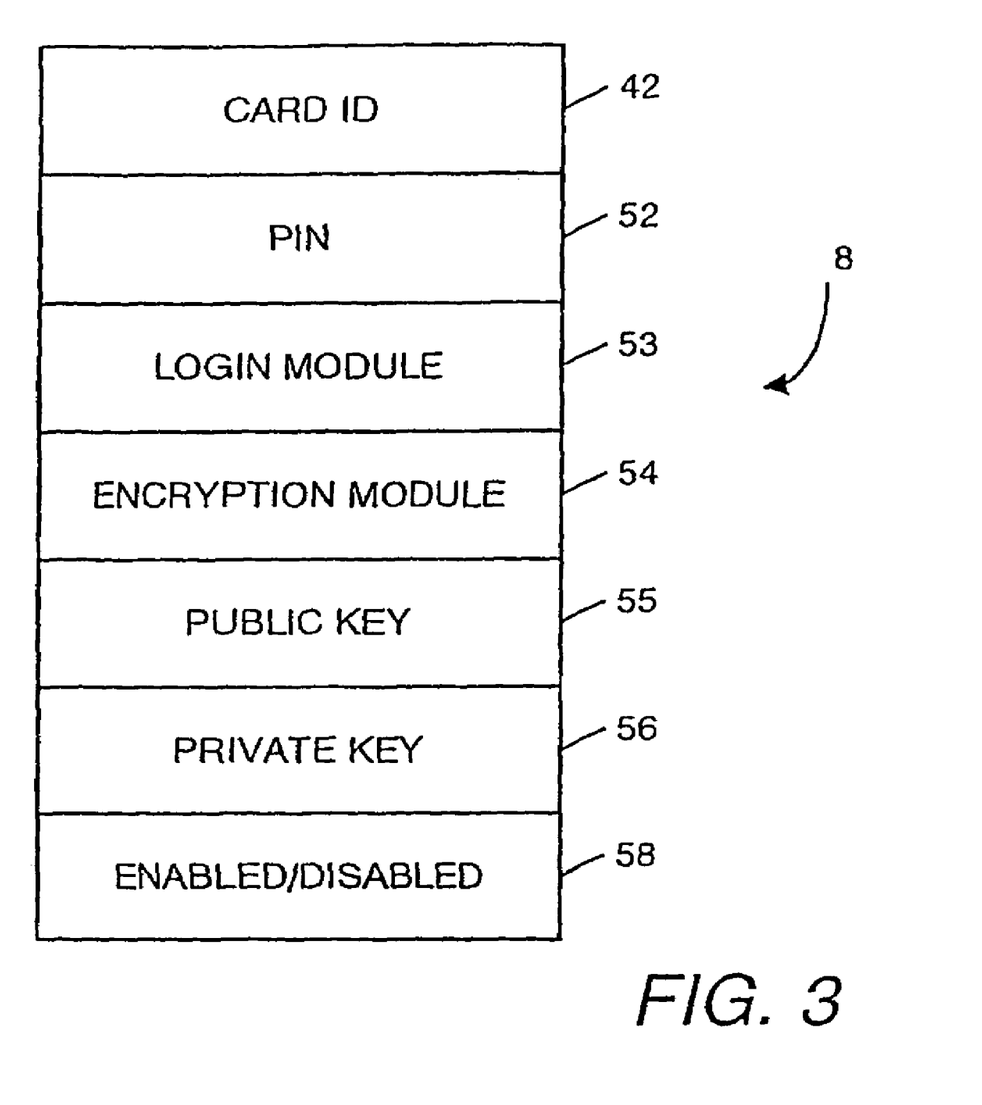
FIG. 3 is a schematic block diagram of a smart card of FIG. 1.

FIG. 3 is a schematic block diagram of program modules and data stored on a smart card 8. In this embodiment each of the smart cards 8-1; 8-m comprises a secure processing device that can process data transmitted from a user station 1-1; 1-n via a smart card reader 7-1; 1-n attached to that user station 1-1; 1-n. Each of the smart cards 8 in this embodiment is arranged to store card identification data 42 being data for identifying the smart card 8 and the authorised user of the smart card 8 to the server 3; a personal identification number 52 being a number to be entered by the authorised user of a smart card 8 to authorise access to the encryption processes provided by the smart card 8; a login module 53 for controlling access to the encryption processes provided by the card 8, an encryption module 54 and public key 55 and private key data 56 for encrypting data; and an enabled/disabled flag 58.

By providing an encryption module 54 and public and private key data 55; 56 on the smart card a means is provided to enable the user of a smart card 8 to sign data for transmission thereby confirming that the data has indeed been authorised by the holder of the smart card 8.

When a smart card 8 is inserted within a smart card reader 7-1; 7-n, access to modules and data stored on the smart card 8 is effected by the user station 1-1; 1-n to which the smart card reader 7-1; 7-n is attached. In this embodiment, access to data and program modules provided on the card 8 is controlled by the interaction of the card interface module 20 and the login module 53. Together, as will be described, these programs interact to require a user to enter data corresponding to the personal identification number 52 stored on the card 8. The fact that data corresponding to the pin number 52 has been entered is then recorded by the status of the enabled/disabled flag 58.

Figure 4:
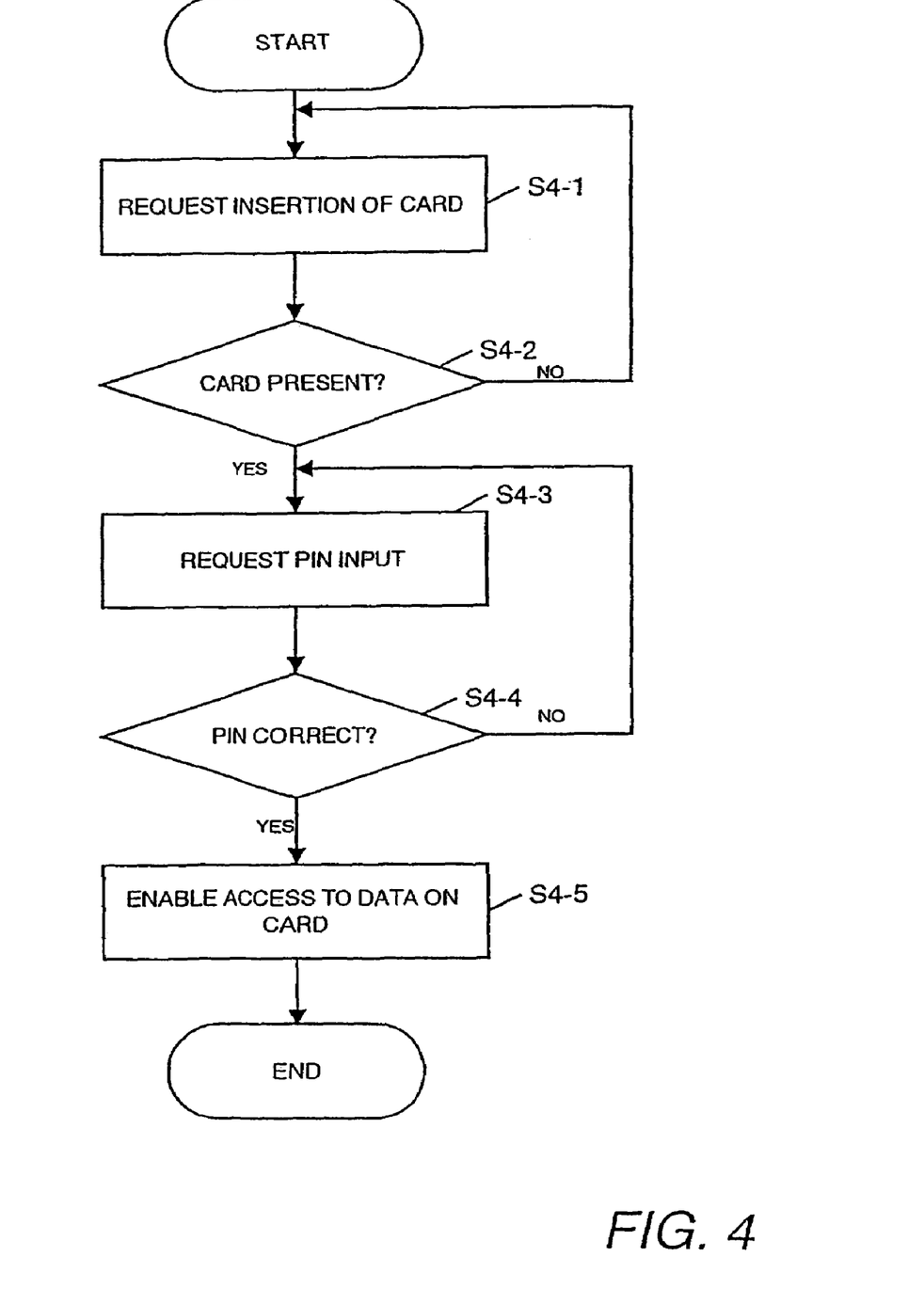
FIG. 4 is a flow diagram of a card log in procedure.

FIG. 4 is a flow diagram of the processing of the interaction between the card interface module 20 on a user station 1-1; 1-n and a login module 53 provided on a smart card 8. Initially (S4-1) the card interface module 20 causes the user station 1-1; 1-$n$ to display to a user a request to insert a smart card 8 into the smart card reader 7-1; 7-$n$ attached to the user station 1-1; 1-$n$.

The card interface module 20 then (S4-2) causes the user station 1-1; 1-$n$ to determine whether a smart card 8 is presently inserted within the smart card reader 7-1; 7-$n$ attached to the user station 1-1; 1-$n$. If this is not the case the card interface module 20 causes (S4-1) a request that a smart card 8 be inserted into the smart card reader 7-1; 7-$n$ to be displayed to the user once again before again determining (S4-2) whether a smart card 8 has indeed been inserted into the reader 7-1; 7-$n$ attached to the user-station 1-1; 1-$n$.

When the card interface module 20 determines that a smart card 8 is present within the smart card reader 7-1; 7-$n$ attached to the user station 1-1; 1-$n$, the card interface module 20 then (S4-3) causes a prompt to be displayed to a user to prompt the user to enter a personal identification number into the user station 1-1; 1-$n$.

When a personal identification number is entered into the user station 1-1; 1-$n$, this is then submitted to the login module 53 provided on the card 8 in the smart card reader 7-1; 7-$n$ attached to the user station 1-1; 1-$n$, which (S4-4) compares the entered identification number with the personal identification number 52 stored on the smart card 8.

If the login module 53 determines that the personal identification number received from the user station 1-1; 1-$n$ does not correspond to the personal identification number 52 stored on the smart card, the login module 53 then causes the card interface module 20 to redisplay the request to input an identification number (S4-3) and when a new number is entered and submitted to the login module 53, the login module 53 rechecks (S4-4) the new identification number entered by a user.

If the login module 53 determines that the identification number entered by a user into the user station 1-1; 1-$n$ corresponds to the personal identification number 52 stored on the smart card 8, the login module 53 then sets (S4-5) the enabled/disabled flag 58 on the smart card 8 to enabled to permit the user station 1-1;1-$n$ to access the encryption module 54 on the smart card 8.

After access to the encryption module 54 on a smart card 8 has been enabled, in this embodiment a user can cause the browser program 22 to transmit a session request which is transmitted via the Internet 5 to the server 3. As will be described in detail later, in response to the dispatch of an initial session request, the server 3 generates a new session identifier which is transmitted to the user station 1-1; 1-$n$ for incorporation in subsequent data transactions from the user station 1-1; 1-$n$ to the server 3. The initial session request also causes the server 3 to generate and dispatch data for generating an initial user interface and a task identifier for effecting an initial stage of an authorisation procedure which is then processed by the browser program 22.

Figure 5:
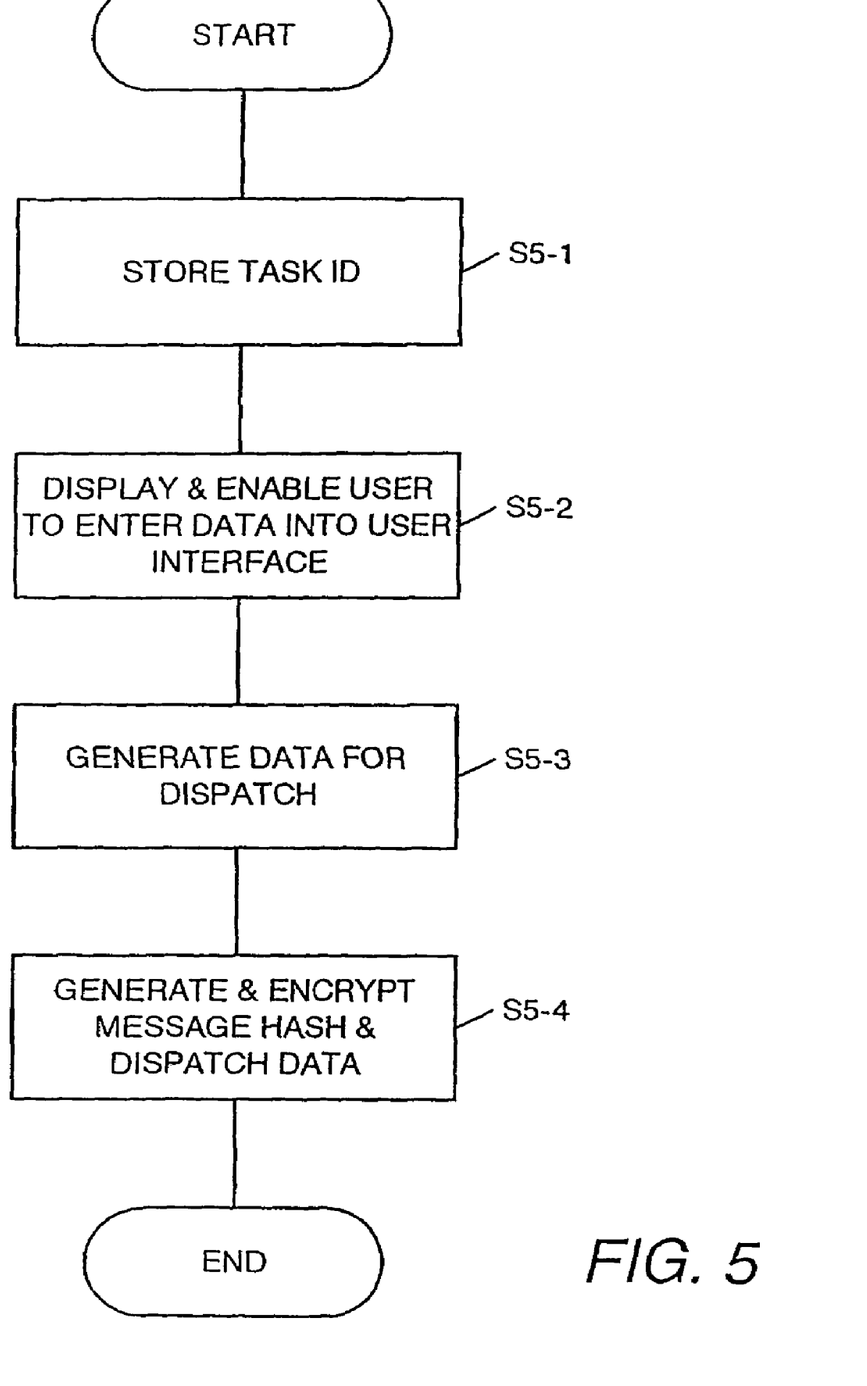
FIG. 5 is a flow diagram of the processing of data to effect an individual stage of a multi-stage authorisation process.

FIG. 5 is a flow diagram of the processing of the browser program 22 in accordance with this embodiment of the present invention. In this embodiment the browser program 22 is invoked whenever a user station 1-1; 1-$n$ receives data for generating a user interface for example an HTML script and task identifier from the server 3.

When the user station 1-1; 1-$n$ receives data from the server 3 via the Internet 5 comprising a task identifier and data for generating a user interface, initially (S5-1) the task identifier is stored within the memory of the user station 1-1.

The user station 1-1; 1-$n$ then (S5-2) proceeds to generate and display a user interface utilizing the received data for generating a user interface such as an HTML script in a conventional manner. In this way a user interface is displayed to a user into which a user can enter data for example name and address data and data identifying authorised actions for subsequent storage as a user record 40. Alternatively, in the case of some data for dispatch when issuing a new smart card 8, for example the card identification number 42 or a public key 55 for public key encryption stored on a new smart card 8, the user interface would prompt a user to insert the smart card 8 being authorised into the card reader 7-7; 7-$n$ and access data on the new smart card 8 to obtain required data for dispatch.

Figure 6A:
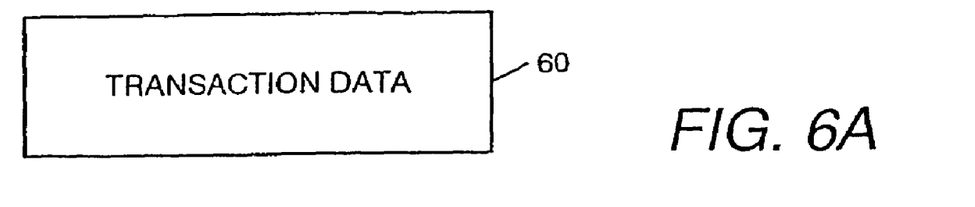
FIGS. 6A, 6B and 6C are schematic block diagrams illustrating the generation of data for dispatch across the public network of FIG. 1.
Figure 6B:
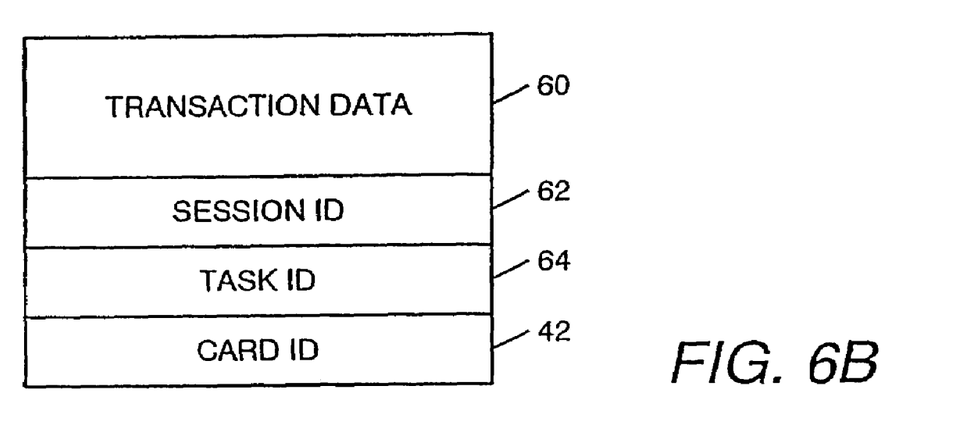
Figure 6C:
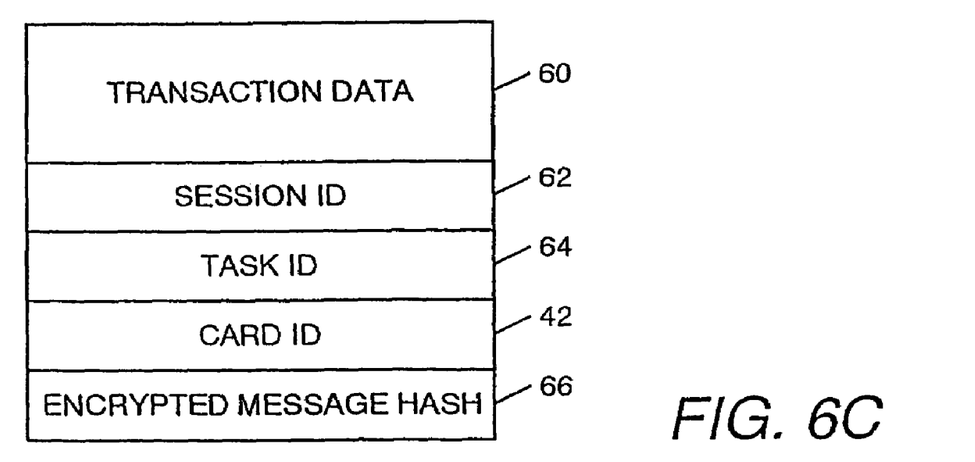

When data for dispatch has been obtained utilising the user interface the browser program 22 then (S5-3) proceeds to generate output data for dispatch back to the server 3. FIGS. 6A, 6B and 6C are schematic block diagrams illustrating the generation of data for dispatch. In this embodiment initially the browser program 22 processes the user inputs, for example text data entered into windows or selections made from a menu generated from the received HTML script or data obtained from a new smart card 8 to generate transaction data 60 for dispatch as is shown in FIG. 6A.

After the transaction data 60 has been generated, the browser program 22 in this embodiment proceeds to append to the transaction data 60 a copy of the session identifier 62 for the current session between the user station 1-1; 1-$n$ and the server 3 which is currently stored within the memory of the user station 1-1, and a copy of the task identifier 64 stored within the memory of the user station 1-1, which had previously been received together with the latest user interface. The browser program 20 then appends to the transaction data 60, session identifier 62 and task identifier 64, a copy of the card identification data 42 of the smart card 8 utilised to initiate the access session with the server 3. FIG. 6B illustrates the input data 60 to which the session identifier, 62 task identifier 64, and card identification data 42 have been appended.

Having appended the session identifier 62, task identifier 64 and card identification data 42 to the transaction data 60 for dispatch, the browser program 22 then (S5-4) generates a message hash from the combined and appended transaction data 60, session identifier 62, task identifier 64 and card identification data 42. This message hash is generated in a conventional way which generates a code number utilizing the transaction data 60, session identifier 62, task identifier 64 and card identification data 42 which is dependent upon the exact constitution of the input data 60, session identifier 62, task identifier 64 and card identification data 42 so that small variations in the data cause substantially different message hashes to be generated.

Finally, the browser program 22 then proceeds to obtain an encrypted form of this calculated message hash by providing the message hash to the encryption module 54 on the smart card 8 within the reader 7-1; 7-$n$ associated with the user station 1-1; 1-$n$. Provided this smart card 8 has been enabled as identified by the enabled/disabled flag 58, this causes encryption module 54 of the smart card 8 to process the message hash to generate an encrypted message hash 66, utilising the private key data 56 stored on the smart card 8. This encrypted message hash 66 is then appended to the input data 60, session identifier 62, task identifier 64 and card identification data 42 as is illustrated in FIG. 6C.

The entirety of the transaction data 60, session identifier 62, task identifier 64 card identification data 42 and encrypted message hash 66 is then dispatched to the server 3 via the Internet 5.

By incorporating the session identifier 62 and task identifier 64 within the data dispatched from a user station 1-1;

1-*n* to the server 3, a means is provided to associate each submission of data from a user station 1-1; 1-*n* with a particular access session and task made during an access session.

By providing a means for generating a message hash which is sensitive to amendments of data utilized to generate the message hash, it is possible to ensure that once the transaction data 60, session identifier 62 task identifier 64 and card identification data 42 have been appended no further amendments occur to the transaction data 60, session identifier 62, task identifier 64 or card identification data 42 subsequent to the generation of the message hash. This is possible because any such amendments would cause a different message hash value to be determined for the amended data.

Finally, by encrypting the message hash utilizing the encryption module 54 and private key data 56 on the smart card 8 within the card reader 7-1; 7-*n* associated with the user station 1-1; 1-*n* making the submission, a means is provided to ensure that the user making the submission is in possession of a valid and authorised smart card 8 and that subsequently the submitted data cannot be repudiated by the holder of the smart card 8 as not having originated with the consent of that user. Thus in this way if the data transmitted via the Internet 5 is intercepted, it is not possible for the data to be amended and then successfully resubmitted to the server 3.

Figure 7:
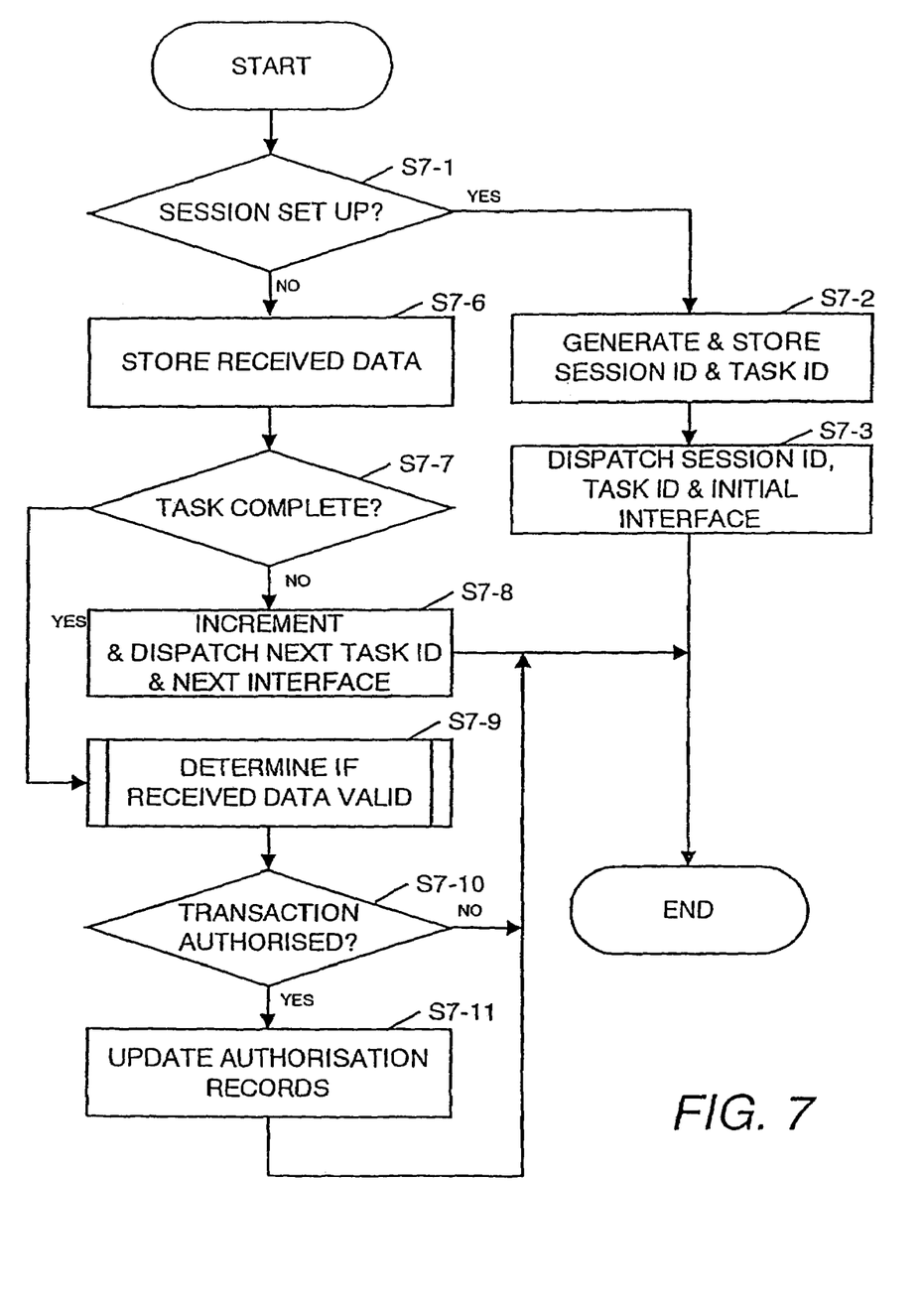
FIG. 7 is a flow diagram of the processing of an issuing program on the server of the computer network of FIG. 1.

FIG. 7 is a flow diagram of the processing of the issuing program 24 in accordance with this embodiment of the present invention. The issuing program 24 is invoked whenever the server 3 receives data from a user station 1-1; 1-*n* via the Internet 5.

Initially (S7-1) when data is received, the issuing program 24 causes the server 3 to determine whether the received data comprises an initial session request and card identification data 42 sent from a user station 1-1; 1-*n*.

If the data received by the server 3 from the Internet 5 comprises an initial session request and card identification data 42, the issuing program 24 then (S7-2) causes the server 3 to generate a new task record 15 comprising a newly generated session identifier 32 a time stamp 33 being the current time indicated by the server 3 and an initial task identifier 34. The issuing program 24 then dispatches a copy of the session identifier 32 and the task identifier 34 together with an HTML script for generating an initial user interface for entering data for authorising a smart card 8 via the Internet 5 back to the user station 1-1; 1-*n* from which the session request and the card identification data 42 had been received. The processing of the issuing program 24 then ends.

If when data is initially received by the server 3, the data is determined (S7-1) not to be an initial session set-up request, the issuing program 24 then (S7-6) proceeds to store the data received from the Internet 5.

After the received data has been stored, the issuing program 24 then proceeds to determine (S7-7) whether all the data necessary for issuing a smart card 8 has been received from the user station 1-1 via the Internet 5.

In this embodiment this is achieved by the issuing program 24 determining whether the database 10 has stored within it a number of task records 15 having the session identifier 32 corresponding to the session identifier 62 received as part of data received from the Internet 5 which corresponds to the number of data exchanges required to effect the multi-part authorisation required for issuing a smart card.

If this is not the case, the issuing program 24 then (S7-8) utilises the task identifier 64 of the received data to select a user interface corresponding to the next task and generates a new task identifier 34 for the next task which is then stored together with the session identifier 62 of the received data and a time stamp 33 indicating the current time as a new task record 15. This task identifier 34 is then dispatched together with the next user interface for effecting the next stage in the multistage authorisation procedure being effected. The processing of the issuing program then ends.

If after data corresponding to part of an authorisation procedure has been received by the server 3, the issuing program 24 determines (S7-7) that data has been received for all of the stages of an authorisation procedure, the issuing program 24 then (S7-9) determines whether all the items of data which have been received are valid.

In this embodiment, the issuing program 24 determines whether data received is valid data independently for each set of data received via the Internet 5.

Figure 8:
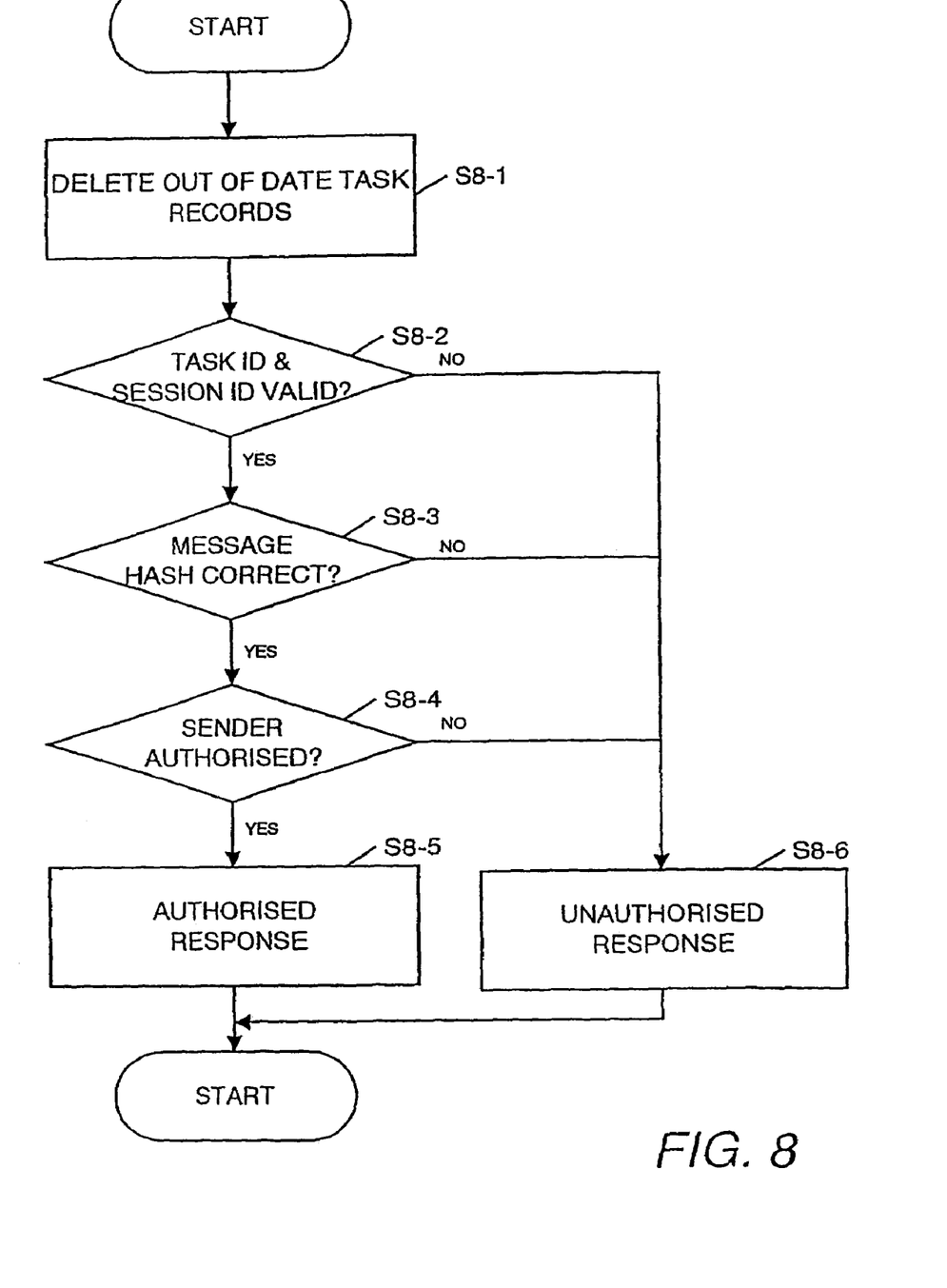
FIG. 8 is a flow diagram of the processing of the issuing program on the server to determine whether a stage of multi-stage authorisation process is authorised.

FIG. 8 is a flow diagram of the processing by the issuing program 24 to determine the validity of received data. The processing of FIG. 8 occurs in relation to each set of data constituting part of a multi-part authorisation procedure.

Initially (S8-1), in this embodiment, the issuing program determines whether any of the task records 15 stored in the database 10 include a time stamp 34 indicating a time older than a default value, for example 15 minutes. If this is the case, the server 3 assumes that the session for which the task record 15 was generated has been interrupted and therefore the server 3 proceeds to delete all the task records 15 including the session identifier 32 corresponding to the session identifier 32 of the task record 15 having an out of date time stamp 34. Thus, in this way the issuing program 22 ensures that the database 10 is periodically purged of unused task records 15 and also the security of the system is increased as each session is limited in duration unless authorisations are regularly completed.

The issuing program 24 then (S8-2) causes the server 3 for each item of stored received data including a session identifier 62 corresponding to the session identifier 62 of the most recently received set of data to determine whether the session identifier 62 and task identifier 64 of each set of received data corresponds to the session identifier 32 and task identifier 34 of a task record 15 stored within the database 10. If this is the case, the task record 15 including the session identifier 32 and task identifier 34 is then deleted from the database 10.

The issuing program 24 then (S8-3) determines whether the message hash data 66 included within each stored data set is valid. In this embodiment, this is determined by the server 3 initially decrypting the encrypted message hash 66 of the stored data set utilising the public key 44 of a user record 17 incorporating the card identification data 42 corresponding to the card identification data 42 included within the received set of data. The server 3 then proceeds to generate a message hash from the stored transaction data 60, session identifier 62, task identifier 64 and card identification data 42 in the same way which has previously been described in relation to the processing by the browser program 22. The data generated by decrypting the encrypted message hash 66 and the generated new message hash from the other data within the data set are then compared. If these are identical, this indicates that the received set of data was also used to generate the message hash encrypted utilising the private key 56 on the smart card 8 identified by the card identification data 42 in the data set and that none of the data within the other data set has been amended after dispatch from the user station 1-1; 1-n.

Finally, after the validity of the task identifier 64 and session identifier 62 in the received data set has been confirmed and the message hash checked, the issuing program 24 then (S8-4) determines whether the authorisation data 64 within the user record 40 incorporating the card identification data 42 corresponding to the card identification data 42 in the received data set includes data identifying the user of that card as being authorised to issue a new smart card. If this is the case, the server 3 records (S8-5) that the data set under consideration is correctly authorised.

If, however, either the task identifier 62 or task identifier 64 are not determined to be valid or the message hash 66 is determined not to be correct or the authorisations 64 for a user are insufficient, the server 3 records the data set as unauthorised (S8-6). This process is then repeated for each of the subsequent data sets received for all the stages of the authorisation.

Returning to FIG. 7, after the validity of each of the data sets involved in a multi-stage authorisation process have been determined, the issuing program 24 then (S7-10) determines whether the entire transaction for generating a new user record 17, and thereby authorising a new smart card 8, is authorised. If this is the case, the server 3 then (S7-11) proceeds to generate a new user record 17 comprising a card identification number 42, public key data 44, authorisation data 46 and user details 48 from the received transaction data 60 whose validity had been confirmed.

Although in the above embodiment an authorisation procedure has been described in which steps in an authorisation procedure are performed sequentially, the present invention is particularly applicable to systems in which stages of an authorisation procedure can be effected in any order. A second embodiment will now be described in which the order of stages in an authorisation procedure may be varied.

SECOND EMBODIMENT

In this embodiment of the present invention the hardware provided corresponds to the hardware in the first embodiment as shown in FIG. 1 and description of the hardware will not be repeated here. However, the processing by the browser program 22 and issuing program 24 is amended to enable the user to vary the order in which tasks in a multi-stage authorisation process are performed.

Figure 9:
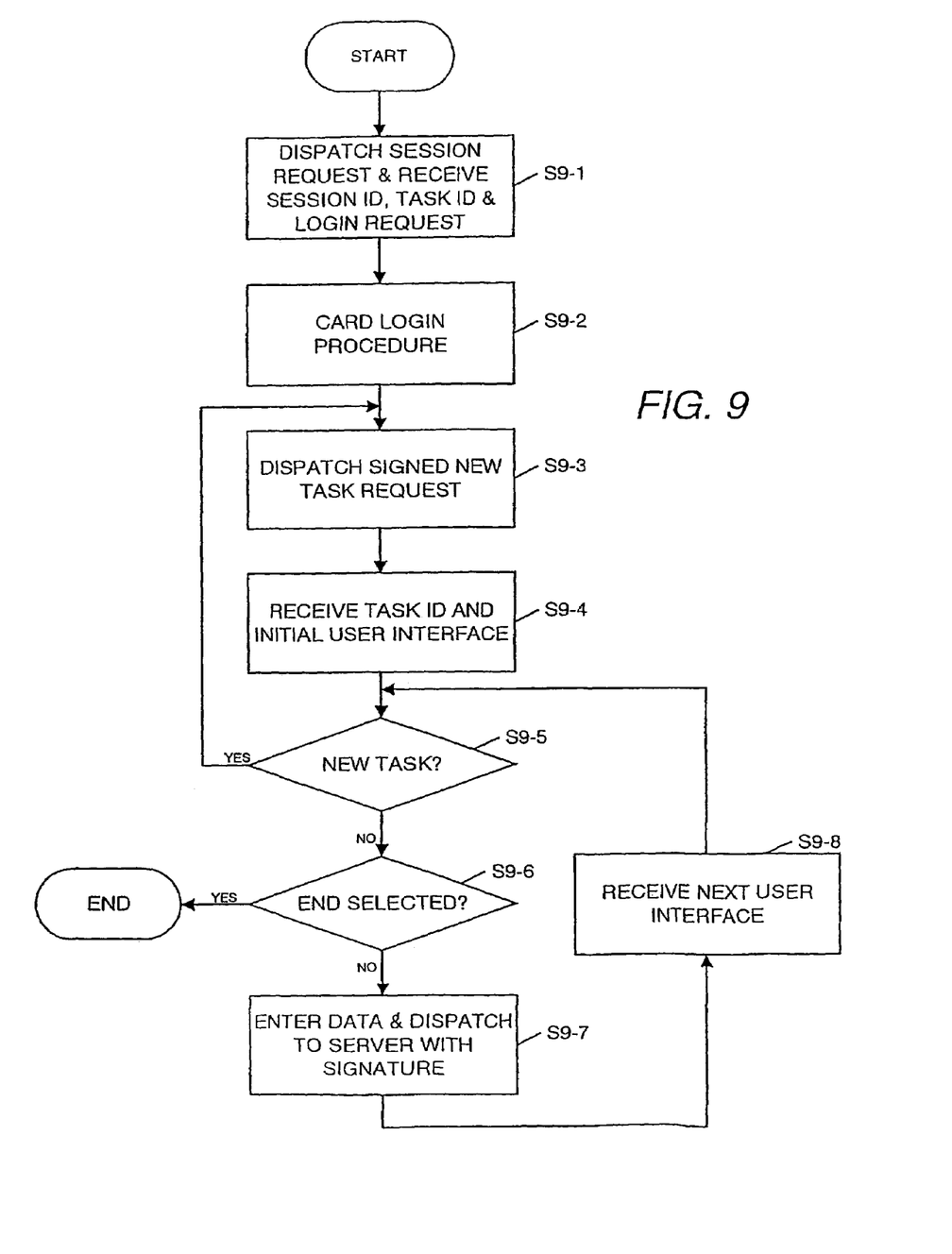
FIG. 9 is a flow diagram of the processing of a user station in accordance with a second embodiment of the present invention.

FIG. 9 is a flow diagram of the processing of a user station 1-1; 1-n in accordance with this embodiment of the present invention. Initially (S9-1) the browser program 22 of the user station 1-1; 1-n is utilized to access the server 3 via the Internet 5 in a conventional manner. As a result of a connection being established between the user station 1-1; 1-n and the server 3 the server 3 dispatches a session identifier 32 and task identifier 34 to the user station 1-1 together with a user interface to effect a login request.

When the session identifier 32 and task identifier 34 are received and stored within the memory of the user station 1-1 the browser program 22 then utilizes the received login user interface to initiate a card login procedure (S9-2) similar to the card login procedure previously described with reference to FIG. 4.

After a user has completed the card login procedure and is therefore able to pass data from the user station 1-1; 1-n to the encryption module 54 of a smart card 8-1; 8-m inserted within the reader 7-1; 7-n attached to the user station 1-1; 1-n, a user is prompted to identify which task they wish to perform by selecting the task from the user interface generated by the browser 22 from the data received from the server 3. When a task has been selected the browser program 22 then dispatches transaction data 60 comprising the new task request together with a copy of the session identifier 32 and task identifier 34, a card identification number 42 and an encrypted message hash 66 in a similar way as has been described in the previous embodiment.

This data is then received and processed by the server 3 which in response dispatches a new task identifier 34 and an initial user interface for the selected task to the user station 1-1; 1-n making the new task request. When (S9-4) this new task identifier and initial user interface are received by the user station 1-1; 1-n, the new task identifier 34 is stored within the memory of the user station 1-1; 1-n and the initial user interface for the selected task is displayed to a user.

In this embodiment, each of the user interfaces dispatched by the server 3 via the Internet 5 to a user station 1-1; 1-n comprise user interfaces enabling a user to either select a new task, end an access session or enter data for effecting an authorisation procedure as part of a task being undertaken. If a user selects to perform a new task on the user interface (S9-5) this causes the user station 1-1 to dispatch transaction data 60 comprising a request for the new task together with the session identifier 32 and task identifier 34 currently stored within the memory of the user station 1-1; 1-n together with a card identifier 42 and an encrypted message hash 66 the same way as has previously been described to the server 3 via the Internet 5. In response to receiving such data the server 3 outputs a new task identifier 34 and initial user interface for the newly selected task and data identifying the step in a process the user interface is to be utilized to effect. These are received by the user station 1-1; 1-n and processed in a similar way in which the initial user interface received following the login procedure is processed (S9-4).

If utilizing the user interface displayed on the user station 1-1; 1-n a user selects to end a session (S9-6) the processing of the browser program 22 finishes.

If the user does not select a new task to be initiated (S9-5) and the user does not make a selection to end the current session (S9-6) but instead (S9-7) the user enters data utilizing the currently displayed user interface when data has been entered to effect a portion of a task this is then dispatched as transaction data 60 together with a copy of the session identifier 62 and task identifier 64 currently in memory, card identification data 42 and an encrypted message hash 66 in the same way as has been described in relation to the first embodiment. Additionally, in this embodiment the browser 22 also dispatches data identifying the step in a process the transaction data 60 represents.

In response to receiving transaction data 60 the server 3 then outputs the next user interface to effect the next stage in the currently selected authorisation process. When this is received (S9-8) it is displayed by the user station 1-1; 1-n the user can again either select to initiate a new task (S9-5) select to end the current session (S9-6) or enter further data to be transmitted as transaction data (S9-7).

Thus in this way by linking some stages in an authorisation procedure as part of the same task for example data entry and the witnessing/authorisation of that data entry where such steps must occur in the specified order the processing of an authorisation procedure in this way ensures that the order in which these steps take place is maintained.

However, by dividing other parts of an authorisation procedure, for example, separate authorisation/witnessing steps between different tasks and enabling a user to select which task is to be performed a flexible work flow can be achieved.

Figure 10:
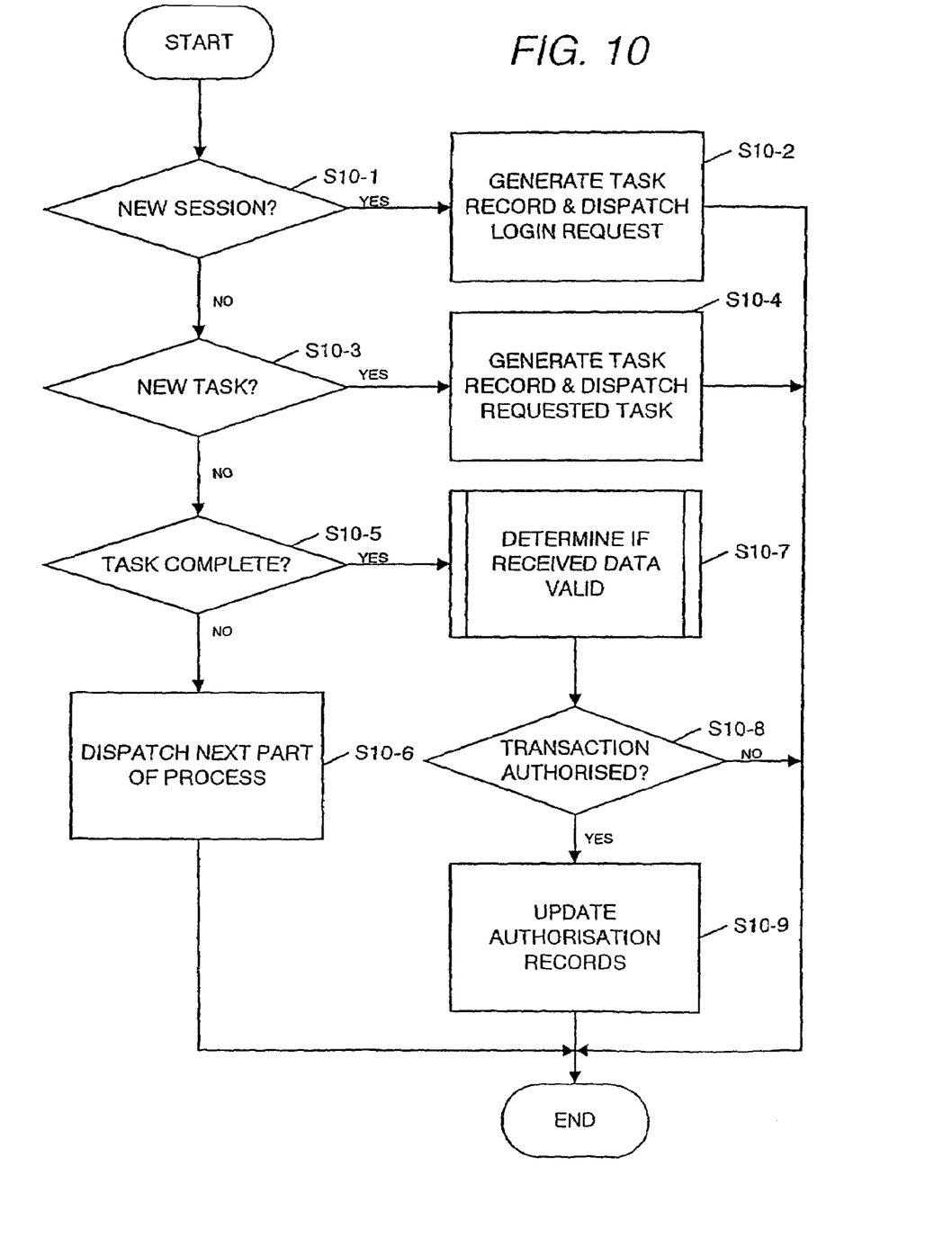
FIG. 10 is a flow diagram of the processing of a server in accordance with a second embodiment of the present invention.

FIG. 10 is a flow diagram of the processing of an issuing program 24 on a server 3 in accordance with this embodiment of the present invention. As in the previous embodiment the issuing program 24 is initiated whenever the server 3 receives data from the Internet 5. Initially, when data is received (S10-1) the issuing program 24 determines whether the data received comprises a new session request. If this is the case the server then (S10-2) proceeds to generate a task record 15 in a similar manner that is described in the first embodiment and dispatch a copy of the session identifier 32 and task identifier 34 of the newly generated task record 15 back to the user station 1-1; 1-n from which a session request has been received together with a user interface for effecting a card login request. The processing of the issuing program 25 then ends.

If, the issuing program 24 determines that received data does not correspond to a new session request the issuing program 24 then (S10-3) determines whether the transaction data 60 received comprises a request to initiate a new task. If this is the case the issuing program 24 then (S10-4) generates a new task record comprising a new task identifier 34 and the session identifier 32 corresponding to the session identifier 62 received together with the new task request in the same manner in which the task record has been described as being generated in the previous embodiment. The issuing program 24 then dispatches a copy of the task identifier 34 of the newly generated task record 15 together with an initial user interface for the requested task. The processing of the issuing program 24 then ends.

If the issuing program 24 determines that transaction data 60 received from the Internet 5 comprises neither a new session request nor a new task request, the issuing program 24 then (S10-5) determines whether the transaction data 60 included within the data received from the Internet 5 comprises an instruction that the data necessary to effect a task has been received and that the received data should now be processed. If this is not the case the issuing program 24 then stores the received transaction data 60, session identifier 62, task identifier 64, card identification data 42 and encrypted message hash 66 and then dispatches the next user interface for inputting data to effect the next stage in the task selected utilizing the data identifying the step the received transaction data 60 is intended to represent. The processing of the issuing program 24 then ends.

If, however, the issuing program 24 determines that the transaction data 60 received comprises an instruction that all of the data necessary to effect an authorisation procedure has been received and that a task is therefore complete the issuing program then (S10-7) proceeds to determine whether the received transaction data 60 necessary to effect the authorisation procedure is indeed valid and that the transaction is therefore authorised (S10-8) and if so update the user record accordingly (S10-9) in a similar way in which the validity of received transaction data is determined as has been described in the first embodiment. However, in this embodiment the deletion of the task records 15 including task identifiers 34 corresponding to a task identifier 64 inn stored received data occurs only after the validity of all of the stored data for effecting a task in an authorisation procedure has been checked. This is because in this embodiment, a single task record 15 is generated for each task in a procedure rather than for each data submission as was described in the first embodiment. After any authorised updates of the user records 17 have occurred, the processing and the issuing program 24 then ends.

AMENDMENTS AND MODIFICATIONS

Although the present invention has been described in relation to systems for issuing smart cards, it will be appreciated that it is also applicable to other on-line systems, for example e-commerce systems in which multiple data sets are transmitted via the Internet. The present invention is also applicable to networks other than the Internet such as internal Intranets or other communications systems such as telephony systems.

Although in the above embodiments systems have been described which data transmitted from a user station 1-1; 1-n is transmitted in an unencrypted form, it will be appreciated that in other embodiments for additional security prior to dispatch via the Internet 5, the browser program 22 could be arranged to encrypt all the data being sent to the server 3 and the server 3 could be arranged to decrypt any data received from the Internet 5.

Although in the above embodiments, the checking of time stamps 33 is described as occurring whenever a task is to be validated, it will be appreciated that deletion of time expired task records 15 could occur periodically instead.

Although in the above embodiments, task records 15 and user records 17 have been described as both being stored on a database 10 separate from the server 3, the database 10 could be arranged only to store the user records 17 with task records being stored on the server 3. An advantage of such an arrangement would be that access to the database 10 would be limited to determining whether transactions were authorised. The amount of data traffic between the server 3 and database 10 would therefore be reduced and the security of the database 10 enhanced.

Although the above embodiments have been described with reference to public/private key encryption systems and smart cards 8, any suitable encryption schemes could be utilized. For example, encryption schemes based on passwords could be used.

Alternatively, instead of utilising a smart card 8 and smart card reader 7-1; 1-n, encryption using a separate hand held encryption device could be used. In such a system message hash data would be generated by a user station 1-1; 1-n and displayed to a user. The displayed message hash data, would then be entered into the separate encryption device which would process the data to generate encrypted data which would then be displayed to a user to enable the user to enter the data into the user station 1-1; 1-n for inclusion in data dispatched to a server. In such a system no direct communication occurs between the user station 1-1; 1-n and the encryption device and hence security is increased.

Also, although confirmation of the validity of a database submission has been described in terms of decrypting an encrypted messages hash, it will be appreciated that confirmation could be achieved by a server repeating the message hash generation and encryption process performed at a user station 1-1; 1-n and comparison of this encrypted message hash with received encrypted message hash could occur.

Alternatively, instead of encrypting only the message hash the entirety of the transaction data, session identifier, task identifier and message hash could be encrypted. Upon receipt decryption of the combined data could occur based upon a decryption method selected utilizing received card identification data and then the validity of the message hash could be confirmed to ensure the received encrypted data had not been amended.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of confirming the validity of a plurality of items of transaction data transmitted from a remote station to a server across an open communications network, said method comprising the steps of:
    at said server, storing a task identifier and dispatching a copy of said task identifier to said remote station;
    at said remote station, for each of said items of transaction data, generating signature data by encryption of a said item of transaction data combined with said copy of said task identifier and dispatching a data set comprising said encrypted signature data, said item of transaction data and identification data to said server;
    at said server, receiving said dispatched data sets, and for each received data set, selecting an encryption method on the basis of identification data in said data set, and determining the validity of an item of transaction data in said data set by utilising said selected encryption method to determine whether received encrypted signature data in said data set corresponds to data generated from combined data incorporating said stored task identifier;
    at said server, in response to receiving at least some of said data sets, storing a second task identifier and dispatching a copy of said second task identifier to said remote station;
wherein said remote station generates signature data utilizing the copy of the second task identifier; and
    dispatching with said copy of said second task identifier means for generating user interface means at said remote station; and utilizing said user interface means to generate an item transaction data for dispatch to said server.

2. A method in accordance with claim 1, wherein said determining step comprises the steps of:
    utilizing said selected encryption method to decrypt said signature data; and
    identifying whether decrypted signature data corresponds to data obtained from processing combined data comprising said item of transaction data and said task identifier.

3. A method in accordance with claim 2, wherein said generation of signature data comprises the steps of:
    generating message hash data by processing a said item of transaction data combined with said task identifier in accordance with a message hash generation method; and
    encrypting said generated message hash data; and
    wherein said identifying step comprises the steps of:
    generating further message hash data by processing a said received item of transaction data combined with said task identifier in accordance with said message hash generation method and comparing said further message hash data with said decrypted signature data.

4. A method in accordance with claim 2, wherein said generation of signature data comprises encrypting said transaction data combined with said task identifier.

5. A method in accordance with claim 1, wherein said determining step comprises the steps of:
    utilizing said selected encryption method to generate further signature data by processing combined data comprising a said item of transaction data and a said task identifier in a received data set; and
    identifying whether said further signature data corresponds to said signature data in said received data set.

6. A method in accordance with claim 5, wherein said generation of signature data comprises the steps of:
    generating message hash data by processing a said item of transaction data combined with said task identifier in accordance with a message hash generation method; and
    encrypting said generated message hash data; and
    wherein said generation of further signature data comprises the steps of:
    generating further message hash data by processing a said item of transaction data combined with a said task identifier in a received data set in accordance with said message hash generation method and encrypting said further message hash data utilizing said selected encryption method.

7. A method in accordance with claim 1, wherein said encryption of a said item of transaction data combined with said task identifier comprises encrypting said combined data utilizing a data processing device accessible by said remote station.

8. A method in accordance with claim 7, wherein said data processing device comprises a smart card.

9. A method in accordance with any of claim 1, wherein said encryption of a said item of transaction data combined with said task identifier comprises the steps of:
    providing a separate encryption device;
    inputting data representative of said item of transaction data and said task identifier into said encryption device;
    utilising said encryption device to encrypt said input data and display encrypted data; and
    inputting displayed encrypted data into said remote station.

10. A method in accordance with claim 1, wherein said storing step comprises storing a task identifier in association with time stamp data indicative of a time of storage and wherein said determining step comprises determining whether time stamp data associated with a task identifier associated with received transaction data is indicative of a time of storage greater than a predetermined time period before receipt of said received transaction data.

* * * * *